(12) United States Patent
Fu et al.

(10) Patent No.: US 9,864,146 B1
(45) Date of Patent: Jan. 9, 2018

(54) FIBER TRAY APPARATUS AND METHOD FOR HANDLING A FIBER-ARRAY/SILICON-PHOTONICS-DIE ASSEMBLY

(71) Applicant: INPHI CORPORATION, Santa Clara, CA (US)

(72) Inventors: Pei-Keng Fu, Santa Clara, CA (US); Chris Kiyoshi Togami, Santa Clara, CA (US); Masaki Kato, Palo Alto, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/356,438

(22) Filed: Nov. 18, 2016

(51) Int. Cl.
*G02B 6/30* (2006.01)
*G02B 6/36* (2006.01)
*G02B 6/38* (2006.01)

(52) U.S. Cl.
CPC ............ *G02B 6/30* (2013.01); *G02B 6/3636* (2013.01); *G02B 6/3893* (2013.01)

(58) Field of Classification Search
CPC .................................. G02B 6/30; G02B 6/00
USPC .......................................................... 385/49
See application file for complete search history.

(56) References Cited

U.S. PATENT DOCUMENTS

| 5,106,006 | A | * | 4/1992 | Suda | G02B 6/25 225/2 |
| 5,732,173 | A | * | 3/1998 | Bylander | G02B 6/1221 385/45 |
| 7,669,744 | B2 | * | 3/2010 | Yazaki | G02B 6/25 225/1 |
| 8,245,405 | B2 | * | 8/2012 | Lu | H02G 1/1217 30/90.1 |

* cited by examiner

*Primary Examiner* — Kaveh C Kianni
(74) *Attorney, Agent, or Firm* — Richard T. Ogawa; Ogawa P.C.

(57) ABSTRACT

An apparatus for handling a fiber-array to be attached with a silicon-photonics chip. The apparatus includes a bottom-plate having a first trench formed with two first branches connected to two first recessed regions at a first end and one second branch straight to a second end thereof and a second trench sharing the same second branch and having two third branches connected to two second recessed regions with an angle towards two sides outside the two first branches. The bottom-plate includes many female clip structures located at the first end, the second end, and the two sides. The apparatus includes a top-plate having corresponding male clip structures configured to lock with the female clip structures to at least have two shaped cavities at the first end for firmly holding fiber ferrules of the fiber-array substantially without lateral and axial motion while leaving excess lengths of fibers outside the second end.

6 Claims, 11 Drawing Sheets

FIBER TRAY APPARATUS AND METHOD FOR HANDLING A FIBER-ARRAY/SILICON-PHOTONICS-DIE ASSEMBLY

CROSS-REFERENCE TO RELATED APPLICATIONS

N/A

BACKGROUND OF THE INVENTION

The present disclosure is related to a fiber-silicon photonics device package structure, more particularly, to a fiber tray and method for handling a fiber-array attached with a silicon-photonics chip.

As science and technology are progressing rapidly, processing speed and capacity of the computer increase correspondingly. To address such requirements bandwidth and data transmission speed for modern life communication network, optical fiber transmission system has replaced the traditional communication transmission system to become a main stream communication technology, which does not have bandwidth limitation, and also has advantages of high speed transmission, long transmission distance, its material is impervious to electromagnetic waves. Therefore, the electronics industry performs research toward optical fiber transmission which will become the mainstream in the future. Said optical communication is a technology in that light waves function as signal carriers and transmitted between two nodes via the optical fiber. Field of optical communication can be divided into optical communication side and electric communication side according to transmission medium. By the optical transceiver, the received optical signal can be converted to an electrical signal capable of being processed by an IC, or the processed electrical signal can be converted to the optical signal to be transmitted via optical fiber. Therefore, objective of communication can be achieved.

More recently, wavelength-division multiplexing (WDM) technology has been widely implemented in both directions on the optical fiber to double total transmission capacity by dividing the work wavelength of optical fiber into multiple channels to enable mass data transmission in one optical fiber. A whole WDM system can be divided into a wavelength division multiplexer at transmitting end and a wavelength division demultiplexer at receiving end. An advanced silicon-photonics transceiver has been developed to be disposed at both transmitting and receiving ends by integrating and assembling with a silicon-photonics chip, a multi-fiber array, one or more laser sources, and corresponding electro-optical signal processing units in a single package that conforms to the QSFP specification.

An apparatus and method are disclosed below for holding the fiber-array, processing the fiber-array to attach with the silicon-photonics chip with proper fiber alignment, transporting and testing the whole sub-package of the fiber-array/silicon-photonics-chip assembly.

BRIEF SUMMARY OF THE INVENTION

The present disclosure is related to a fiber-silicon photonics device package structure, more particularly, to a fiber tray and method for handling a fiber-array coupled with a silicon-photonics (SiPho) die. In certain embodiments, the invention is applied for mass production, packaging, and testing of a sub-package of fiber-array/SiPho chip assembly for making an advanced SiPho transceiver for both transmitting and receiving ends of an optical communication network, though other applications are possible.

In a specific embodiment, the present invention provides an apparatus for handling a fiber-array. The apparatus includes a bottom-plate comprising a first Y-shaped trench and a second Y-shaped trench formed in a top surface thereof. The first Y-shaped trench has two first branches respectively connected to two first recessed regions straightly towards a first end of the bottom-plate and one second branch laid backwards to a second end of the bottom-plate. The second Y-shaped trench shares the same second branch and has two third branches laid outside the two first branches respectively connected to two second recessed regions with an angle towards two sides of the bottom-plate. The bottom-plate further includes a plurality of female clip structures formed at both the first end and the second end. The apparatus further includes a top-plate comprising two third recessed regions formed in a bottom surface at a third end thereof, two fourth recessed regions formed in the bottom surface with the angle respectively towards two sides of the top-plate, and a plurality of male clip structures formed at both the third end and the fourth end. The plurality of male clip structures is configured to lock respectively with the plurality of female clip structures as the bottom surface of the top-plate is engaged with the top surface of the bottom-plate with the third end being aligned with the first end and the fourth end being aligned with the second end such that the two third recessed regions are opposed to the two first recessed regions to form two first cavities connected to the two first branches of the first Y-shaped trench enclosed therein and the two fourth recessed regions are opposed to the two second recessed region to form two second cavities connected to the two third branches of the second Y-shaped trench enclosed therein.

In an alternative embodiment, the present invention provides a method of using the fiber tray to handle a fiber-array in association with a silicon-photonics chip. The method includes disposing a fiber-array of two PM fibers of excess lengths having one end terminated by two LC ferrules and two single-mode fibers of excess lengths having one end terminated by two LC receptacles to the bottom plate. The two PM fibers are loaded in the first Y-shaped trench with the two LC ferrules being held inside the two first recessed regions at the first end and two bare fibers of extra lengths extended outside the second end. The two single-mode fibers are loaded in the second Y-shaped trench with the two LC receptacles being held inside the two second recessed regions at two sides and two bare fibers of extra lengths extended outside the second end via the second branch commonly shared by the two PM fibers. Additionally, the method includes covering the top-plate over the bottom-plate by mating the plurality of male clip structures of the top-plate with the corresponding plurality of female clip structures to substantially fixedly hold the fiber-array in the fiber tray with at least the two LC ferrules being partially enclosed in the two first cavities substantially without lateral and axial motion except rotation with two tip regions of the two LC ferrules being exposed outside the first end and the two LC receptacles being partially enclosed in the two second cavities substantially without lateral and axial motion. The method further includes cleaving the fiber-array by laser at a predetermined distance away from the second end along a perpendicular line within +/−10 microns and aligning the two PM fibers in the fiber-array. Furthermore, the method includes attaching a length from the cleaved end of the fiber-array with the aligned PM fibers to a silicon-photonics chip. The method further includes providing epoxy to the length of the fiber-array while placing a cover lid over thereof and adding strain relief epoxy around a near-by section of the fiber-array beyond the cover lid. Furthermore, the method includes installing a protective cover from the second end to the fiber tray to enclose the silicon-photonics chip attached with the fiber-array. Moreover, the method includes mounting the bottom-plate of the fiber tray onto a test station for conducting optical and electrical tests on the silicon-photonics chip attached with the fiber-array. The fiber-array is fixedly held in the fiber tray with correspondingly two LC receptacles respectively connected to two external fibers via two LC ferrules and two LC ferrules respectively coupled to other two external fibers via two LC receptacles.

The present invention provides a fiber tray that has many advantages for handling fibers in processes of laser cleaving to achieve better control in fiber lengths in the fiber array. By holding the terminated ferrules and receptacles firmed in places without lateral or axial motion but allowing rotational fiber alignment on PM fibers within the fiber-array, the cleaved and aligned fibers in the fiber-array can be attached to an array of V-grooves etched in top surface of a photonics chip such that the ends of fibers are just in contacts with shoulder of the V-groove/nanotaper without chipping off the nanotaper position with broken fiber or causing excess gap to result in large optical power loss. Further, by directly mounting a sub-package of fiber tray holding the assembly of the fiber-array attached to the SiPho die onto a test station without removing each fiber assembly held therein, avoiding many operator or measurement tool related mishandling damages. Furthermore, by coupling a protective cover to the fiber tray the SiPho die and the nearest section of fiber-array extended outside the fiber tray also can be protected in a full package, which provides full protection during its shipment. The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present disclosure is related to a fiber-silicon photonics device package structure, more particularly, to a fiber tray and method for handling a fiber array coupled with a silicon-photonics (SiPho) die. In certain embodiments, the invention is applied for mass production, packaging, and testing of a sub-package of fiber-array/chip assembly for making an advanced SiPho transceiver for both transmitting and receiving ends of an optical communication network, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
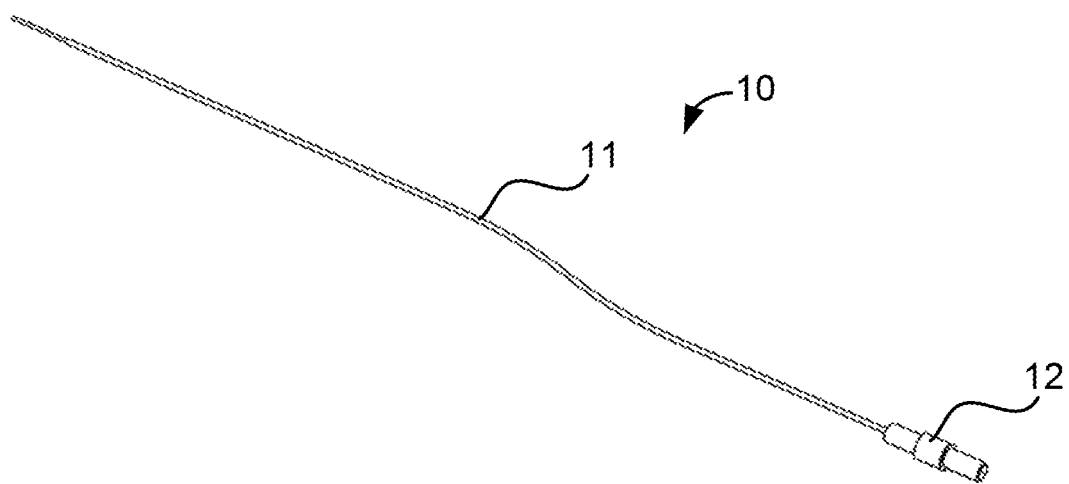
FIG. 1A is a perspective view of a LC fiber ferrule assembly as part of a fiber-array according to an embodiment of the present invention.

FIG. 1A is a perspective view of a LC fiber/ferrule assembly as part of a fiber-array according to an embodiment of the present invention. As shown, the LC fiber/ferrule assembly 10 is a bare fiber 11 with one end terminated with a LC ferrule 12. The fiber 11 can be a single mode fiber or a polarization mode (PM) fiber. The LC fiber/ferrule assembly 10 is selected to be one member of a fiber-array to be handled, processed, and attached with a silicon-photonics chip in some embodiments of the present disclosure. In particular, the fiber 11 of the LC fiber/ferrule assembly 10 is a PM fiber for installing into a SOSA optical transceiver in a single package that conforms to the QSFP specification.

Figure 1B:
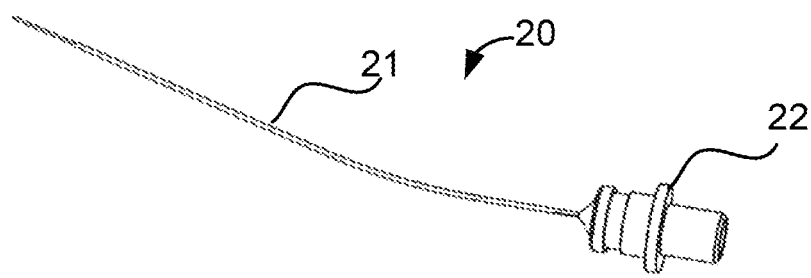
FIG. 1B is a perspective view of a LC fiber receptacle assembly as part of a fiber-array according to an embodiment of the present invention.

FIG. 1B is a perspective view of a LC fiber/receptacle assembly as part of a fiber-array according to an embodiment of the present invention. As shown, the LC fiber/receptacle assembly 20 is a bare fiber 21 with one end terminated with a LC receptacle 22. The fiber 21 can be a single mode fiber. The LC fiber/receptacle assembly 20 is also selected to be one member of the fiber-array to be handled, processed, and attached with a silicon-photonics chip in some embodiments of the present disclosure. The silicon-photonics chip and the attached fiber-array is configured as a component to be installed in a SOSA optical transceiver in a single package that conforms to the QSFP specification.

Figure 2:
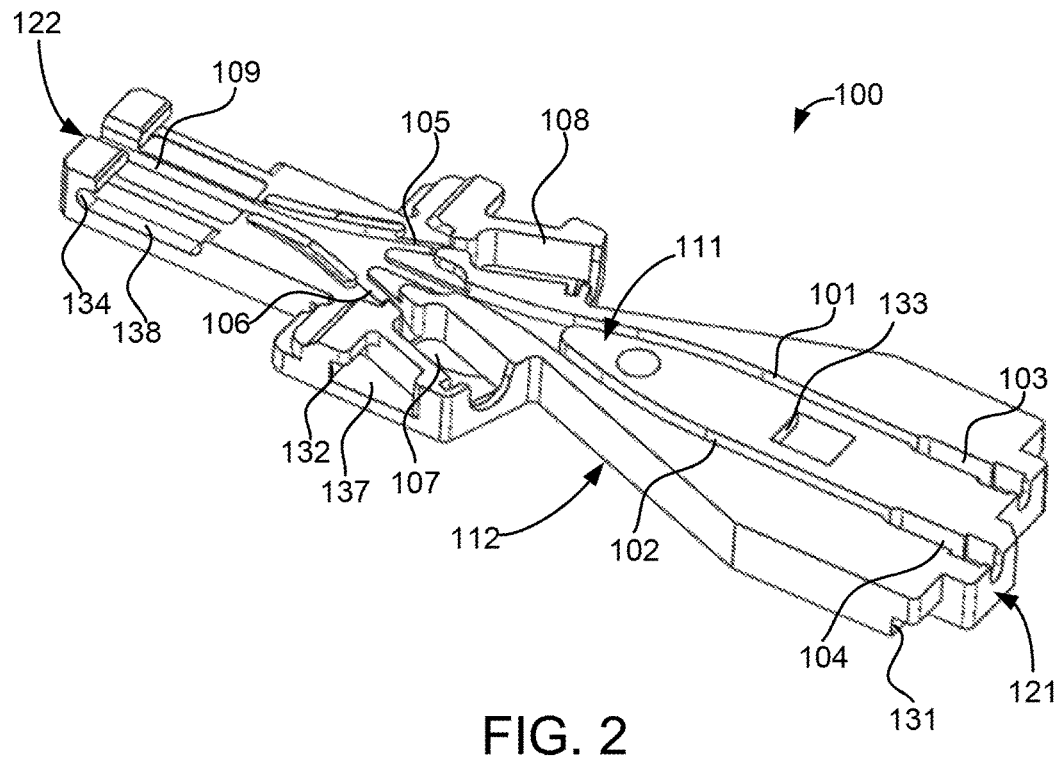
FIG. 2 is a perspective top view of a bottom-plate of a fiber tray apparatus according to an embodiment of the present invention.

FIG. 2 is a perspective top view of a bottom-plate of a fiber tray apparatus according to an embodiment of the present invention. This diagram is merely an example, which should not unduly limit the scope of the claims. One of ordinary skill in the art would recognize many variations, alternatives, and modifications. In an embodiment, a fiber tray is disclosed here for handling a fiber-array including one or more LC fiber/ferrule assemblies 10 and one or more LC fiber/receptacle assemblies 20 with excess fiber lengths. The fiber tray is designed with a bottom-plate operably engaged with a top-plate. Both the bottom-plate and the top-plate are made by a plastic material with polished surface. In an example, the plastic material is ESD A2180 type material that has a light weight about 20 g. The bottom-plate 100 is shown in FIG. 2 and the top-plate 200 configured to be mated with the bottom-plate 100 will be shown in later section of the disclosure.

Referring to FIG. 2 in a perspective view, the bottom-plate 100 is a shaped plate structure with a top surface 111 visible surrounded by a first end 121, a second end 122, and two sides of uneven shape. A first Y-shaped trench is formed in the top surface 111, including two first branches 101 and 102 towards the first end 121 joined by a second branch 109 towards the second end 122. The two first branches of the first Y-shaped trench are respectively connected to a pair of first recessed regions 103 and 104 formed along a direction straight to reach the first end 121. Each of the pair of first recessed regions is configured with a shape well-fitted for loading in and partially holding a fiber ferrule (e.g., a LC ferrule 12). Additionally, a second Y-shaped trench is formed in the top surface 111 with two third branches 105 and 106 being located outside the two first branches 101 and 102 joined with the second branch 109 commonly shared by the first Y-shaped trench. The two third branches 105 and 106 are respectively directed to a pair of second recessed regions 107 and 108 with an angle towards the two sides of the bottom-plate 100. Each of the pair of second recessed regions is configured with a shape well-fitted for loading in and partially holding a fiber connector receptacle (e.g., a LC receptacle 22). The size of the second recessed region 107 (108) is naturally larger than the size of the first recessed region 103 (104). The sides are correspondingly shaped to give a path for an external fiber connector ferrule to be inserted along the same angle into the fiber connector receptacle held in the second recessed region 107 (108).

In an alternative embodiment, the bottom-plate 100 can be configured with different fiber loading trenches connected to alternative recessed regions for holding 6 fiber assemblies or even 8 fiber assemblies. For example, the bottom-plate is able to allow four fiber-assemblies 10 each having a bare fiber with excess length connected to a ferrule) and two fiber assemblies 20 each having a bare fiber with excess length connected to a connector receptacle. In another example, the bottom-plate is able to allow six fiber-assemblies 10 each having a bare fiber with excess length connected to a ferrule) and two fiber assemblies 20 each having a bare fiber with excess length connected to a connector receptacle.

Referring to FIG. 2 again, the bottom-plate 100 also includes a plurality of female clip structures respectively located at the first end, the second end, the two sides, and a central region too. For example, a pair of female clip structures 131 are formed at two corners of the first end 121 of the bottom-plate 100 and a pair of female clip structures 132 is formed at two sides next to the two second recessed regions 107 and 108. Also, a pair of female clip structures 134 is formed at two corners of the second end 122 and another female clip structure 133 is formed near a central region. In an embodiment, the pair of female clip structures 131 are substantially similar step structures with an extra notch down to the bottom surface 112 to form an L-shaped space oriented towards the second end direction. The pair of female clip structures 132 are formed at two sides outside the two second recessed regions 107 (108). A similar L-shaped notch space is extended from a flat terrace 137 that is a distance above the bottom surface 112. The pair of female clip structures 134 are also similar to the female clip structure 132 having a L-shaped notch space extended from a narrower flat terrace 138. All of those L-shaped notches, although their position or lateral dimension may be different, are oriented straightly towards the second end 122 of the bottom-plate 100. Alternatively, the female clip structure 133 forms a L-shaped notch with a through hole having a smaller rectangular-shaped opening in the top surface 111 and a bigger rectangular-shaped opening in the bottom surface 112. Again this L-shaped notch is oriented along the length direction of the openings and straightly towards the second end 122.

Figure 3:
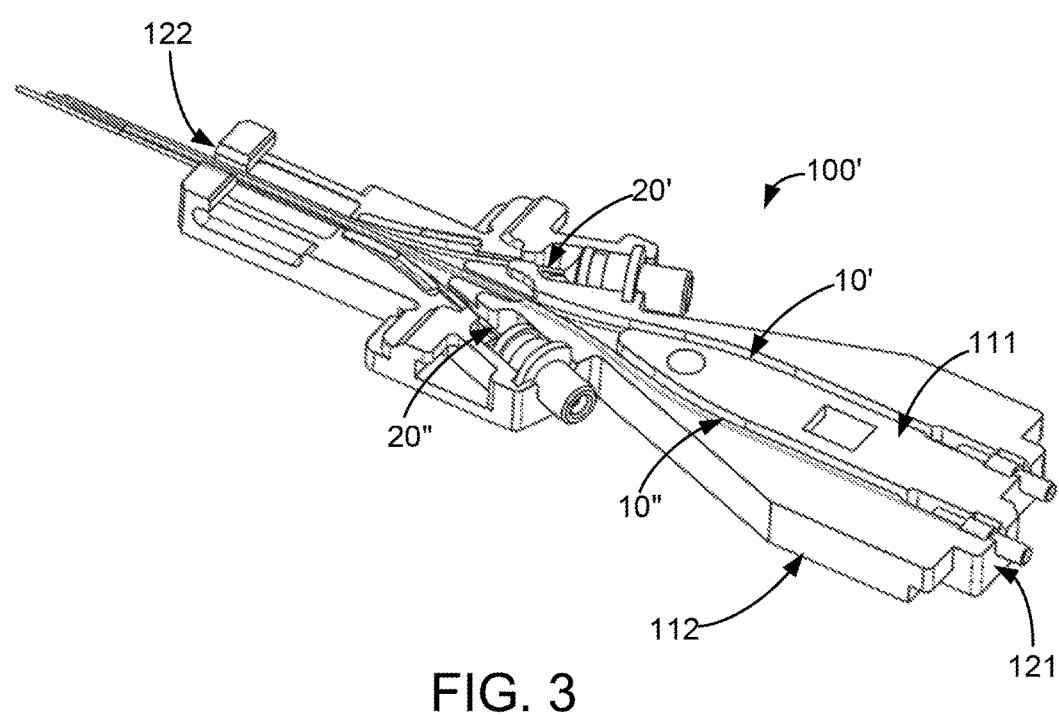
FIG. 3 is a perspective top view of a fiber-array with LC receptacles and LC ferrule assemblies disposed in the bottom-plate of a fiber tray apparatus of FIG. 2 according to the embodiment of the present invention.

FIG. 3 is a perspective top view of a fiber-array with LC receptacles and LC ferrule assemblies disposed in the bottom-plate of a fiber tray apparatus of FIG. 2 according to the embodiment of the present invention. This diagram is merely an example, which should not unduly limit the scope of the claims. One of ordinary skill in the art would recognize many variations, alternatives, and modifications. As it is designed, the bottom-plate 100' is loaded with a fiber array of multiple fiber assemblies. In a specific embodiment, two fiber assemblies are loaded in the first Y-shaped trench with one LC fiber/ferrule assembly 10' being disposed in one first branch 101 with one LC ferrule (12) being held in the first recessed region 103 and another LC fiber/ferrule assembly 10" being disposed in another first branch 102 with another LC ferrule (12) being held in another first recessed region 104. The opposite fiber tails of those two fiber assemblies are laid into the second branch 109 with excess lengths of bare fibers out of the second end 122. Two additional fiber assemblies are loaded in the second Y-shaped trench with one LC fiber/receptacle assembly 20' being disposed in one third branch 105 with one LC connector receptacle (22) being held in one second recessed region 107 and another one LC fiber/receptacle assembly 20" being disposed in another third branch 106 with another LC connector receptacle (22) being held in another second recessed region 108. The opposite fiber tails of the last two fiber assemblies are also laid into the second branch 109, shared with the first two fiber tails, with excess lengths of bare fibers out of the second end 122.

Figure 4:
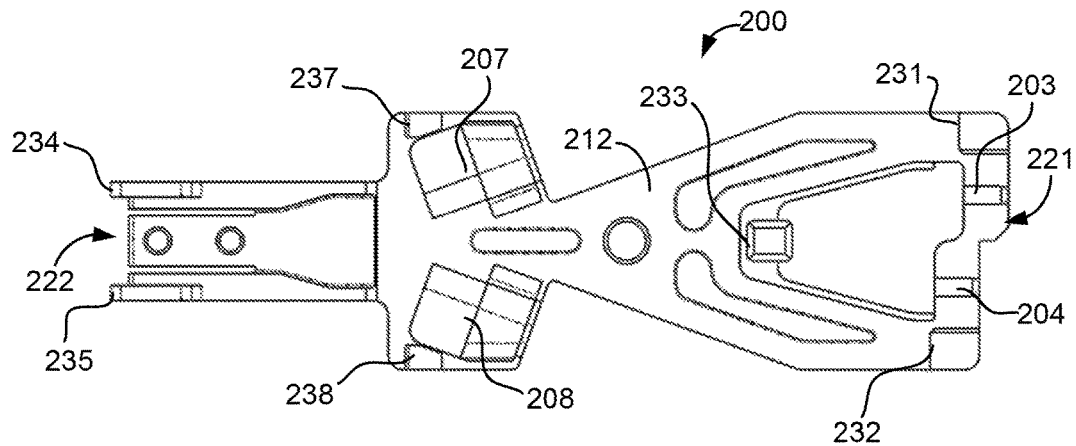
FIG. 4 is a bottom view of a top-plate of a fiber tray apparatus according to an embodiment of the present invention.

FIG. 4 is a bottom view of a top-plate of a fiber tray apparatus according to an embodiment of the present invention. This diagram is merely an example, which should not unduly limit the scope of the claims. One of ordinary skill in the art would recognize many variations, alternatives, and modifications. In an embodiment, this top-plate 200 is designed to be mated with the bottom-plate 100 (of FIG. 2) to form a fiber tray for handling a fiber-array. The top-plate is made from a ESD plastic material having polished surface and a light weight of about 20 g. In a specific embodiment, a bottom surface 212 of the top-plate 200 shown in FIG. 4 is designated to be engaged with the top surface 111 of the bottom-plate 100 of FIG. 3. In particular, the bottom surface 212 is surrounded by a third end 221, a fourth end 222, and two sides having substantially same shape as the two sides of the bottom-plate 100. As the top-plate 200 is engaged with the bottom-plate 100, the third end 221 is supposed to be opposed to the first end 121 and the fourth end 222 is supposed to be opposed to the second end 122.

Referring to FIG. 4, a pair of third recessed regions 203 and 204 are formed at two separate locations of the third end 221 and a pair of fourth recessed regions 207 and 208 are formed respectively towards two sides of the top-plate 200 with the same angle of two second recessed regions 107 and 108 relative to the two sides of the bottom-plate 100. The location of the third recessed region 203 (204) is designed to make it to match with the corresponding first recessed region 103 (104) to complete a first cavity with a shape well-fitted for holding a LC ferrule 12. The fourth recessed region 207 (208) also is configured to match with the corresponding second recessed region 107 (108) to complete a second cavity with a shape well-fitted for holding a LC connector receptacle 22. In the present disclosure, the first cavity formed by having the first recessed region 103 opposed to the third recessed region 203 is specially shaped to fit a LC type ferrule. Of course, the first cavity can be reshaped to fit other types of fiber ferrules. In the present disclosure, the second cavity formed by having the second recessed region 107 opposed to the fourth recessed region 207 is specially shaped to fit a LC type receptacle. Of course, the first cavity can be reshaped to fit other types of fiber connector receptacle.

Also directly visible in the bottom view of the top-plate 100, a plurality of male clip structures are respectively formed at two corners of the third end, two corners of the fourth end, two side edges outside the pair of fourth recessed regions 207 and 208. More details about these clip structures can be seen in side views of both the top-plate 200 in part A) of FIG. 5 and the bottom plate 100 in part B) of FIG. 5.

Figure 5:
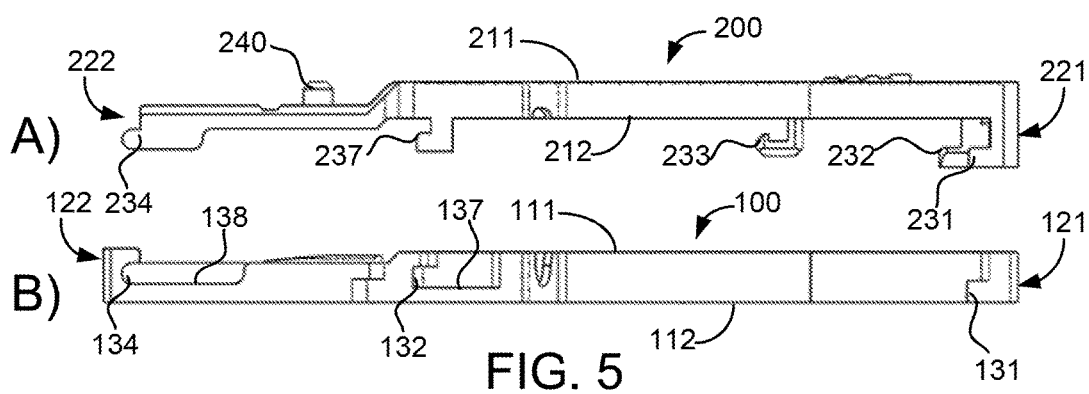
FIG. 5 is a side view of (A) the top-plate of FIG. 4 and (B) the bottom-plate of FIG. 2 configured to be engaged together to form a fiber tray according to an embodiment of the present invention.

Referring to FIG. 4 and FIG. 5, a pair of male clip structures 231 and 232 are protruded a certain distance below the bottom surface 212 and located at the corners of the third end 221. In an embodiment, each male clip structure 231 (232) is an L-shaped clip configured to match the corresponding L-shaped notch 131 of the bottom-plate 100. Similarly, a pair of male clip structure 237 and 238 are protruded a smaller distance below the bottom surface 212 and located at two side edges in a L-shaped structure for mating with the corresponding L-shaped notch 132 of the bottom-plate 100 by sliding along the flat terrace 137. Additionally, a pair of male clip structures 234 and 235 are formed at two corners of the fourth end 222 and configured to slide against the flat terrace 138 to lock with the L-shaped notch 134 of the bottom-plate 100. Furthermore, another male clip structure 233 in L-shape is protruded near a central region and configured to mate with the corresponding L-shaped notch 133. Once the bottom surface 212 of the top-plate 200 is engaged with the top surface 111 of the bottom-plate 100 at a first position, all male clip structures of the top-plate 200 are able to lock with corresponding female clip structures of the bottom-plate 100 like a latch by sliding the top-plate 200 a short distance against the bottom-plate 100 along a direction from the first (or third) end 121 to the second (or fourth) end 122. Optionally, each L-shaped clip or notch may have straight angled edge or rounded edge or a shaped edge with an extra bump as enhanced mechanism for achieving more secured lock between any two mated clip structures. Optionally, other mechanical structures other than the L-shaped clip can be employed to achieve the same result for engaging two plates together to form a fiber tray for handling a fiber array during various production, shipping, or testing operations.

In an alternative embodiment, the bottom surface of the top-plate 200 is configured to match the one bottom-plate 100 that has been configured to hold 6 or 8 fiber assemblies to form a fiber tray that is able to allow four or six fiber assemblies 10 similar to the LC fiber/ferrule assembly plus two fiber assemblies 20 similar to the LC fiber/receptacle assembly. Accordingly, 4 or 6 first cavities are formed near the first end of the fiber tray to firmly hold 4 or 6 ferrules and connected to 4 or 6 trenches for disposing associated 4 or 6 fiber tails with excess lengths freely extended out of the second end through a common trench of the fiber tray. Two second cavities are still formed next to the two sides of the fiber tray to hold two connector receptacles and connected to two trenches for disposing two associated fiber tails with excess lengths freely extended out of the second end through the common trench of the fiber tray.

Figure 6:
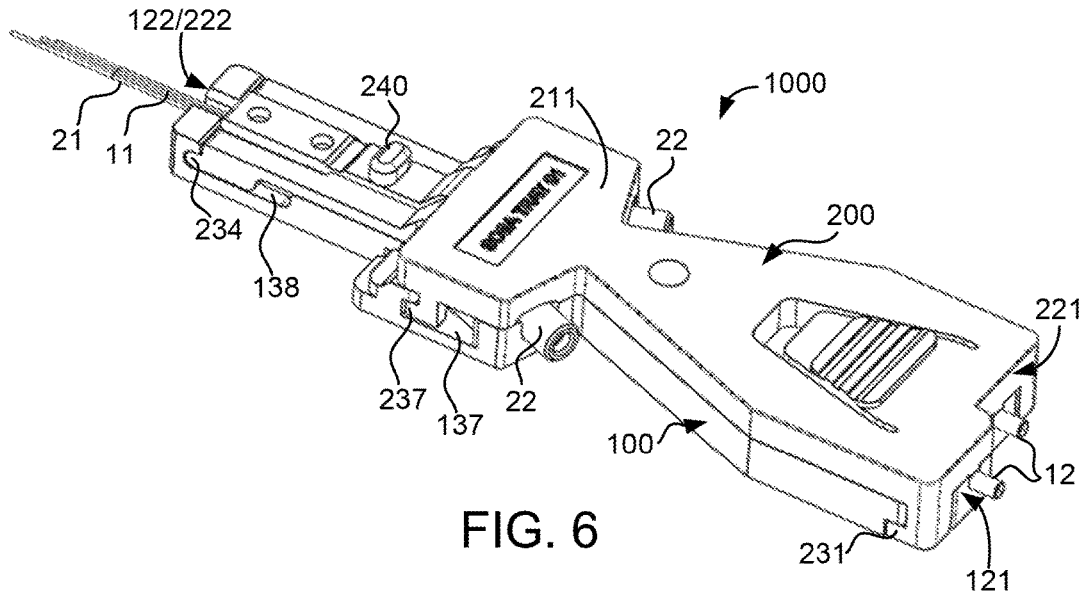
FIG. 6 is a perspective view of a fiber tray firmly holding the fiber-array of excess lengths according to an embodiment of the present invention.

FIG. 6 is a perspective view of a sub-package of a fiber tray firmly holding the fiber-array of excess lengths according to an embodiment of the present invention. This diagram is merely an example, which should not unduly limit the scope of the claims. One of ordinary skill in the art would recognize many variations, alternatives, and modifications. As shown, the top-plate 200 has been engaged with the bottom-plate 100 with a fiber-array being loaded therein to complete a sub-package of a fiber tray 1000 holding the fiber-array. From the perspective view, the male and female clip structures are locked to each other and two LC ferrules 12 are held in two first cavities and two LC connector receptacles 22 are held in two second cavities.

By design, the shape of the first cavity can just hold a LC ferrule to prevent it from substantially any lateral and axial motion except rotation and also the shape of the second cavity can just hold a LC connector receptacle to prevent it from substantially any lateral and axial motion. As shown, both tip regions of the LC ferrule 12 and the LC connector receptacle 22 are exposed and can be accessible externally for possible fiber adjustment or alignment operation. On the opposite part of the fiber-array, excess lengths of bare fibers are flexibly allowed for each fiber so that some uneven lengths of fibers are extended outside the second/fourth end 122/222 of the fiber tray in this sub-package. Among the four fibers in the fiber-array, two fibers 11 disposed in the middle are connected to the two LC ferrules 12 and two fibers 12 disposed at two outer sides are connected to the two LC connector receptacles 22. Further referring to FIG. 6, the top surface 211 of the top-plate 200 is visible in this perspective view of the sub-package of the fiber tray holding the fiber-array. A protruded bump 240 is formed on the top surface 211 and can be used as a lock mechanism for coupling with a protective cover (to be disclosed below) as an additional part attached to the fiber tray from the second end 122 of the bottom-plate 100.

Figure 7:
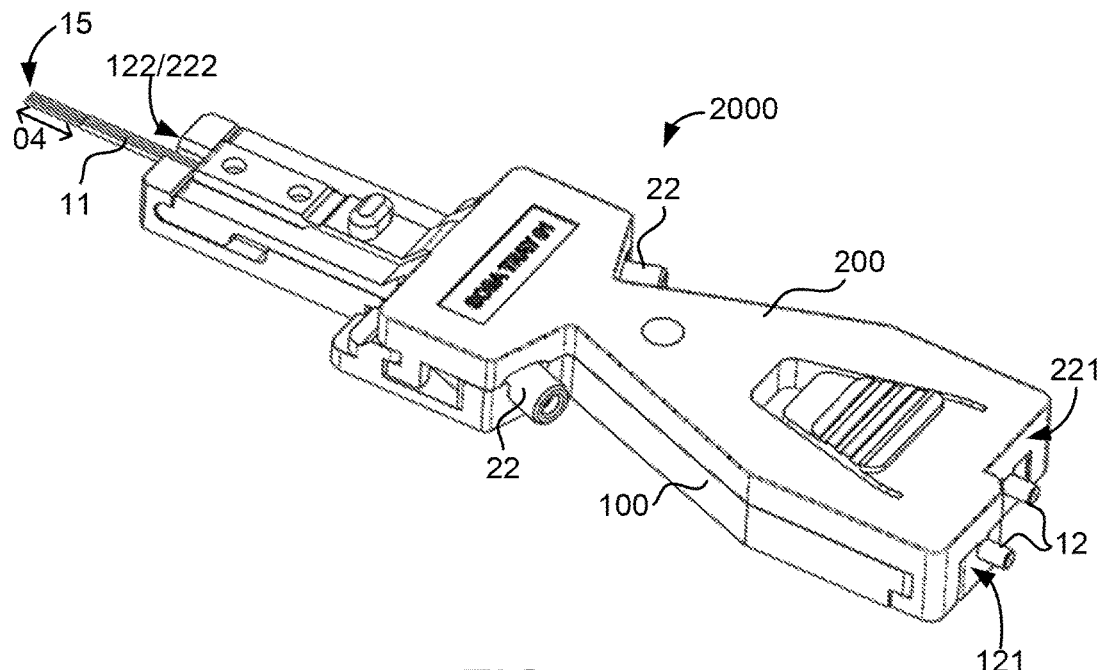
FIG. 7 is a perspective view of the fiber tray firmly holding the fiber-array with laser-cleaved fiber ends according to an embodiment of the present invention.

FIG. 7 is a perspective view of the fiber tray firmly holding the fiber-array with laser-cleaved fiber ends according to an embodiment of the present invention. This diagram is merely an example, which should not unduly limit the scope of the claims. One of ordinary skill in the art would recognize many variations, alternatives, and modifications. In the sub-package 2000 as shown in FIG. 6, the fiber-array has been firmed held inside the fiber tray and all bare fibers with excess lengths are confined in an array through the second branch of the Y-shaped trench and extended out of second (fourth) end 122 (222). This sub-package 2000 can be conveniently handled to perform a cleave process to cut all fibers along a perpendicular line 15 set at a distance away from the second end 122. Optionally, the cleave process can be done manually. Optionally, the cleave process is done by laser with a controlled precision of +/−10 µm among all fibers in the array. The high precision of +/−10 µm at the cleaved ends of the fiber-array ensures a perfect attachment of the fiber-array to a silicon-photonics chip to form a fiber-array/SiPho-die assembly. Optionally, the distance of the cleavage line from the second end 122 is predetermined with a less stringent requirement of +/−500 µm for disposing the fiber-array/SiPho-die assembly to a compact package of an optical transceiver. Additionally shown in FIG. 7, all fibers have their claddings being stripped within a controlled length 04 from the precisely cleaved ends 15 which are at least not shorter than the length of V-grooves of the silicon-photonics chip. More details about attaching the bare fibers in the fiber-array to the V-grooves of the silicon-photonics chip are disclosed below.

Figure 8:
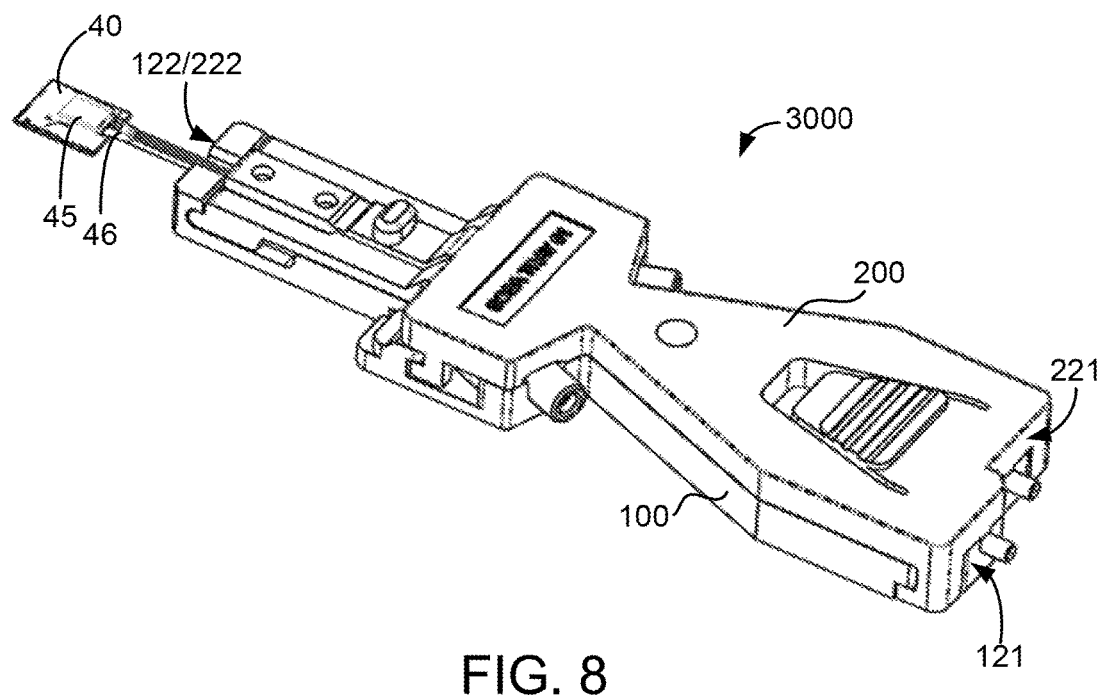
FIG. 8 is a perspective view of the fiber tray firmly holding the fiber-array with an assembled SiPho die according to an embodiment of the present invention.

FIG. 8 is a perspective view of the fiber tray firmly holding the fiber-array with an attached SiPho die according to an embodiment of the present invention. This diagram is merely an example, which should not unduly limit the scope of the claims. One of ordinary skill in the art would recognize many variations, alternatives, and modifications. As shown, another sub-package 3000 is formed by attaching the fiber-array of the sub-package 2000 to a silicon-photonics chip 40. As shown in FIG. 7, the fiber-array is firmed held by the fiber tray in sub-package 2000 during the cleaving process so that the fiber-array can be properly handled without messing up fibers. Additionally, the LC ferrules of two fiber/ferrule assemblies are held in the two first cavities substantially without any lateral and axial motion except rotation and two tip regions of the two LC ferrules 12 are exposed at the first end 121 (see FIG. 7). In an embodiment, the fibers of the fiber/ferrule assemblies are PM fibers. Thus, a fiber alignment process must be done before or during fiber attachment process. Provided the way the fiber-array held by the fiber tray in the sub-package 2000, the rotational alignment process can be easily done by working with the exposed tip regions of the LC ferrules from the first end 121 (see FIG. 7). During the process of attaching the fiber-array of the sub-package 2000 to the silicon-photonics chip 40, the cleaved fiber ends have substantially equal length of bare fibers with stripped cladding so that no chipping the waveguides in the silicon-photonics die 40 by fibers with unequal-length. Additionally shown in FIG. 8, the fiber-array attachment process also includes placing a cover lid 45 over the bare fiber section of the fiber-array and securing it by epoxy and further adding strain relief epoxy 46 around the fibers beyond the cover lid 45 at an edge region of the SiPho die 40. More detailed descriptions of the fiber-array attachment with the silicon-photonics chip and PM fiber alignment can be found in following sections of the specification.

Figure 9A:
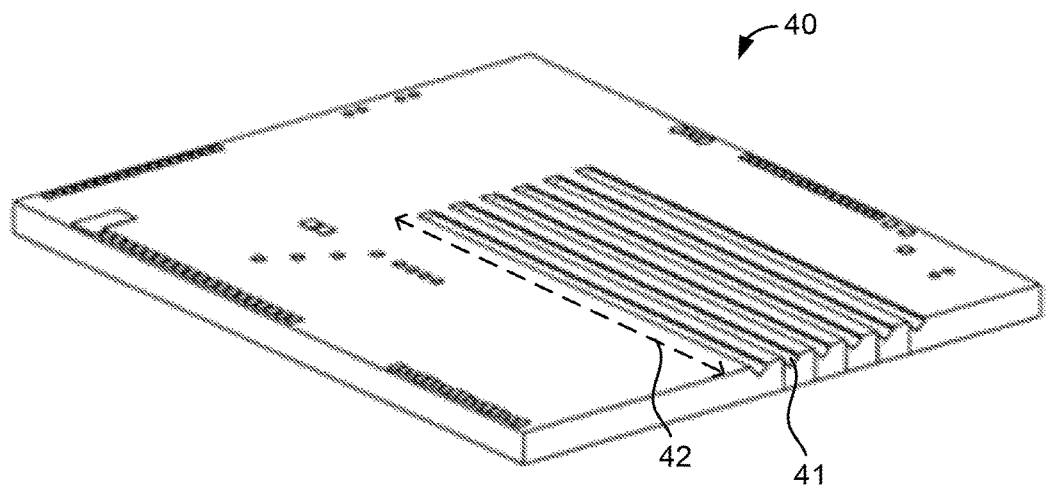
FIG. 9A is a perspective view of a SiPho die with pre-fabricated V-groves for coupling with a fiber-array according to an embodiment of the present invention.
Figure 9B:
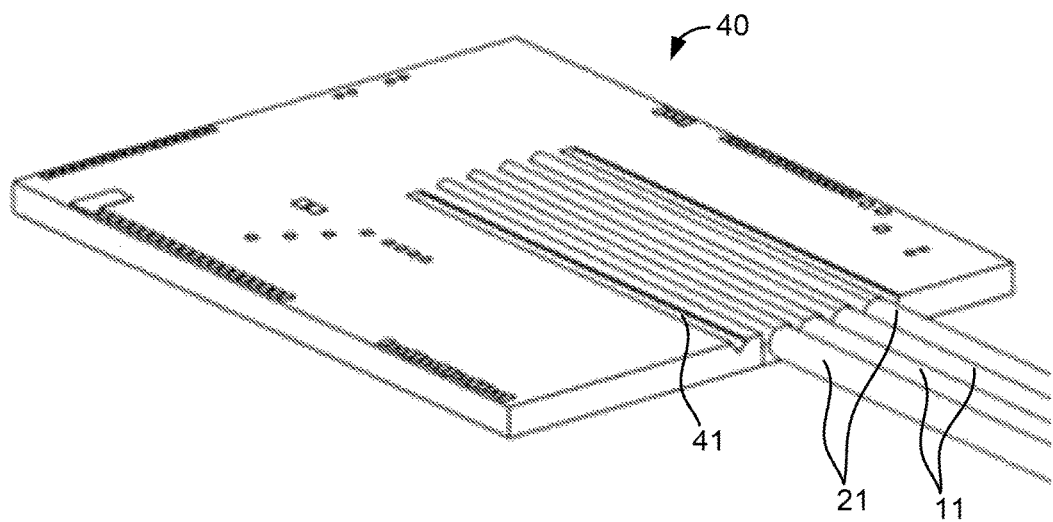
FIG. 9B is a perspective view of the SiPho die with a fiber-array being assembled in the V-groves according to the embodiment of the present invention.

FIG. 9A is a perspective view of a SiPho die with pre-fabricated V-groves for coupling with a fiber-array according to an embodiment of the present invention. This diagram is merely an example, which should not unduly limit the scope of the claims. One of ordinary skill in the art would recognize many variations, alternatives, and modifications. As shown, the silicon-photonics chip (SiPho die) 40 is shown with 6 prefabricated V-groves 41 etched into a top surface thereof. All 6 V-groves are laid in parallel to each other and perpendicular to one edge of the SiPho die having a same length 42. The end point of each V-grove is connected to a waveguide (not shown) built in the SiPho die. FIG. 9B is a perspective view of the SiPho die with a fiber-array being assembled in the V-groves according to the embodiment of the present invention. The fiber-array contains four fibers respectively being assembled with the SiPho die with each fiber tail being loaded into one V-grove. Two inner-positioned fibers 11 in the fiber-array are supposed to be the fibers connected to the LC ferrules 12 in the fiber-array and two outer-positioned fibers 12 are connected to the LC connector receptacles 22 in the fiber-array.

Figure 9C:
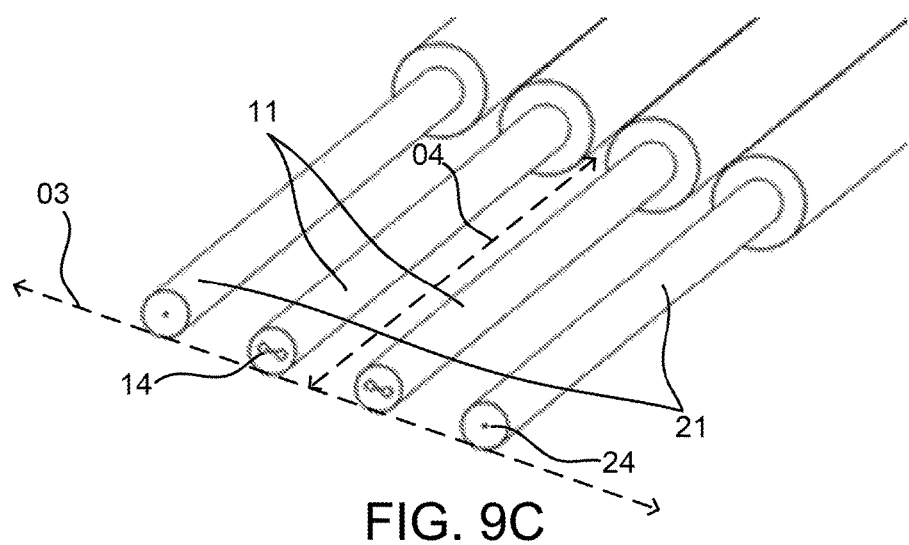
FIG. 9C is a perspective view of a 4-fiber array comprising two PM fibers located in the middle of the array with horizontal fiber-core alignment according to an embodiment of the present invention.

FIG. 9C is a perspective view of a 4-fiber array comprising two PM fibers located in the middle of the array with horizontal fiber-core alignment according to an embodiment of the present invention. This diagram is merely an example, which should not unduly limit the scope of the claims. One of ordinary skill in the art would recognize many variations, alternatives, and modifications. This is a specific example of fiber-array used in the present disclosure. Optionally, the 4-fiber array is subjected to laser cleave process to cut along a perpendicular line 03. Optionally, all four fibers are aligned in a same plane. Optionally, two inner-positioned fibers 11 are PM fibers connected to the LC ferrules 12 in the fiber-array used in the present disclosure and two outer-positioned fibers 12 are single mode fibers connected to the LC connector receptacles 22 in the fiber-array. Optionally, the PM fibers 11 are aligned to such that their two stress-rods 14 are aligned in the same plane of the fiber-array which is supposed to be in parallel to a top surface of the SiPho die where the V-groves are formed by etching. The fiber core 24 of the single mode fiber 22 is located also in the same plane. Optionally, all four fibers have a section of bare fiber tail without cladding up to a same length 04 which is at least greater than or equal to the length 42 of the V-grove formed in the top surface of the SiPho die 40. Optionally, all fibers are single-mode fibers. Optionally, all fibers are PM fibers that need fiber alignment as described above. Optionally, any combination of single-mode or PM mode fibers can be loaded in the fiber tray for forming a corresponding fiber array for various applications.

Figure 9D:
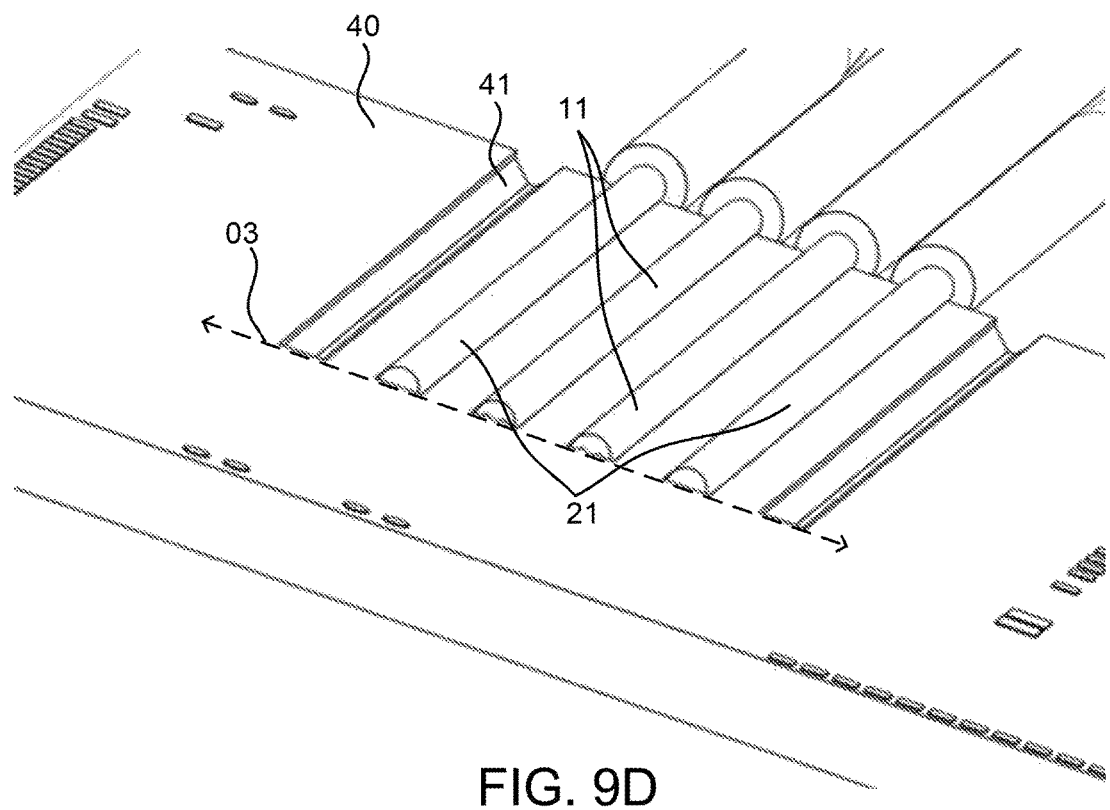
FIG. 9D is a perspective view of the 4-fiber array with alignment being coupled with the SiPho die according to the embodiment of the present invention.

FIG. 9D is a perspective view of the 4-fiber array with alignment being coupled with the SiPho die according to the embodiment of the present invention. This diagram is merely an example, which should not unduly limit the scope of the claims. One of ordinary skill in the art would recognize many variations, alternatives, and modifications. After using the fiber tray of the present invention to handle the 4-fiber fiber-array for conducting fiber cut via laser cleave, stripping cladding material up to a length 04 no smaller than a length 42 of V-groves etched in the top surface of the SiPho die, and aligning them in a plane and aligning two stress-rods of PM fibers in parallel to the top surface of the SiPho die, the four fibers are loaded respectively into four V-groves 41 of the SiPho die 40. Etched V grooves in the SiPho die allow the fibers to be placed such that the optical axis closely aligns to the optical nano taper axis in the SiPho chip (about 5-10 μm below the top surface of the chip). The fiber array (held by the fiber tray) is then moved axially along the V-grooves until the fibers ends are just in contacts with shoulder of the V groove/nano taper. Due to well controlled laser cleaving of the fiber-array while being held by the fiber tray, the fiber lengths across the cutting line is substantially the same with only 10 μm tolerance, avoiding any chipping of the nano taper by longer fibers or forming excess gap to cause large optical power loss by shorter fibers. Once each fiber position is set, the PM fiber stress rods need to be aligned visually to the top surface of the chip. The exposed LC ferrules allow the operator to rotate the LC ferrule until the PM rods are aligned. All fibers are aligned especially the PM fibers are aligned to have two stress-rods of each PM fiber in parallel to the top surface of the SiPho die 40.

Figure 10A:
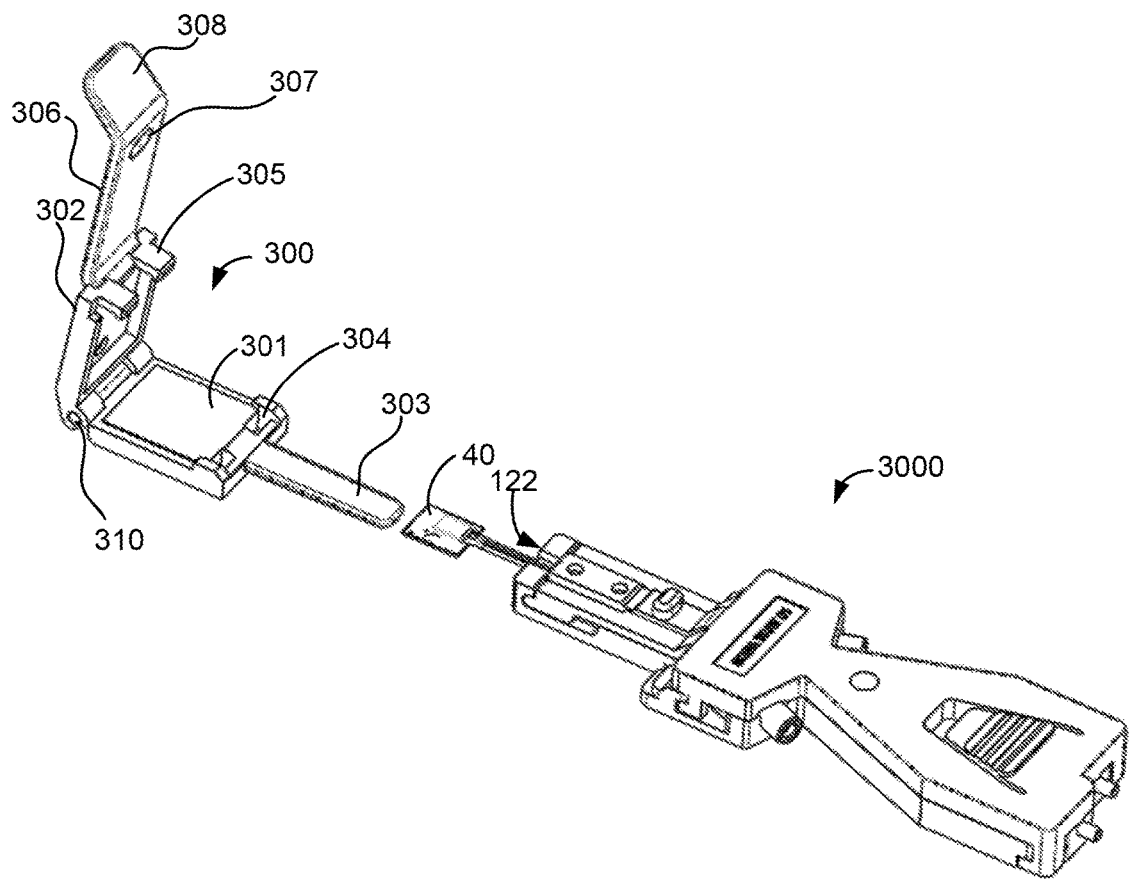
FIG. 10A is a perspective view of a protective cover to be coupled with the fiber tray holding the fiber-array attached to the SiPho-die according to an embodiment of the present invention.

In a specific embodiment, the fiber tray can include a protective cover as an attachable component. FIG. 10A is a perspective view of a protective cover to be coupled with the fiber tray holding the fiber-array attached to the SiPho-die according to an embodiment of the present invention. This diagram is merely an example, which should not unduly limit the scope of the claims. One of ordinary skill in the art would recognize many variations, alternatives, and modifications. As shown, the protective cover 300 includes a first member 301 and a second member 302 rotationally coupled to each other via a hinge 310 at a first edge (a joint edge). The first member 301 includes a tail portion 303 in an elongated thin plate shape extended from a second edge thereof. In an embodiment, the bottom-plate 100 comprises an open slot (not explicitly shown) at the second end 122 configured to allow the tail portion 303 to be slide therein so that the protective cover 300 can be coupled to the bottom-plate 100 the fiber tray sub-package 3000. The first member 301 further includes a pair of female clip structures 304 located at two corner positions of the second edge thereof. The second member 302 includes a pair of male clip structures 305 located at corresponding two corner positions of a third edge thereof. The second member 302 further includes an extended handle 306 naturally extended from the third edge. The extended handle 306 includes a through-hole 307 located near a joint of a strait portion and a lifting portion 308. The protective cover 300 is made by a same ESD plastic material used from the fiber tray.

Figure 10B:
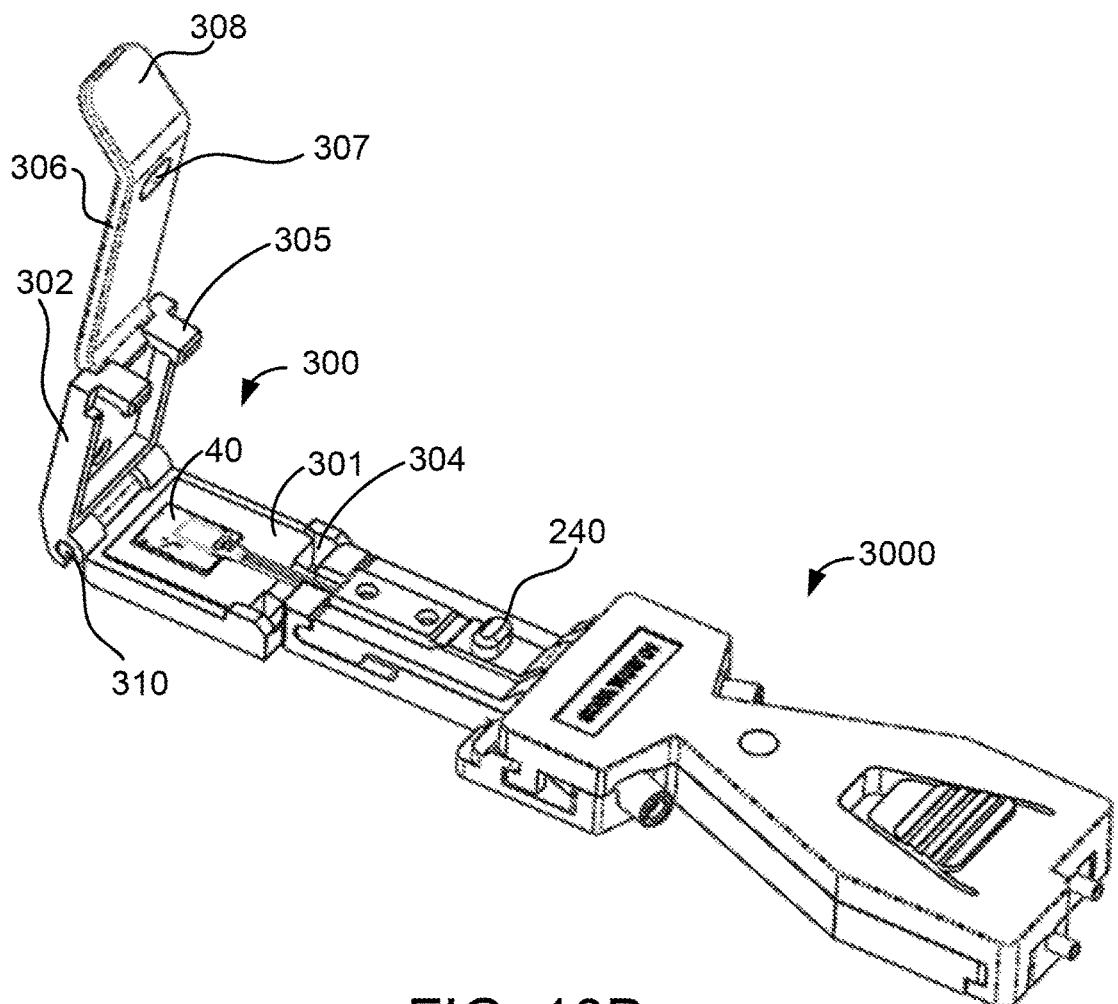
FIG. 10B is a perspective view of the protective cover in an opened position installed in the fiber tray according to the embodiment of the present invention.

FIG. 10B is a perspective view of the protective cover 300 in an opened position installed in the fiber tray according to the embodiment of the present invention. This diagram is merely an example, which should not unduly limit the scope of the claims. One of ordinary skill in the art would recognize many variations, alternatives, and modifications. As shown, the tail portion 303 is inserted into the open slot from the second end 122 of the bottom-plate 100 to couple the protective cover 300 with the fiber tray. By designing the proper size of the first member 301, the length of the tail portion 303, and a size of the silicon-photonics chip 40 attached with the fiber-array, the first member 301 of the protective cover 300 coupled with the fiber tray sub-package 3000 is able to partially contain the SiPho chip 40 as well as a section of attached fiber-array in a recessed region thereof. The second member 302 remains open in this position.

Figure 10C:
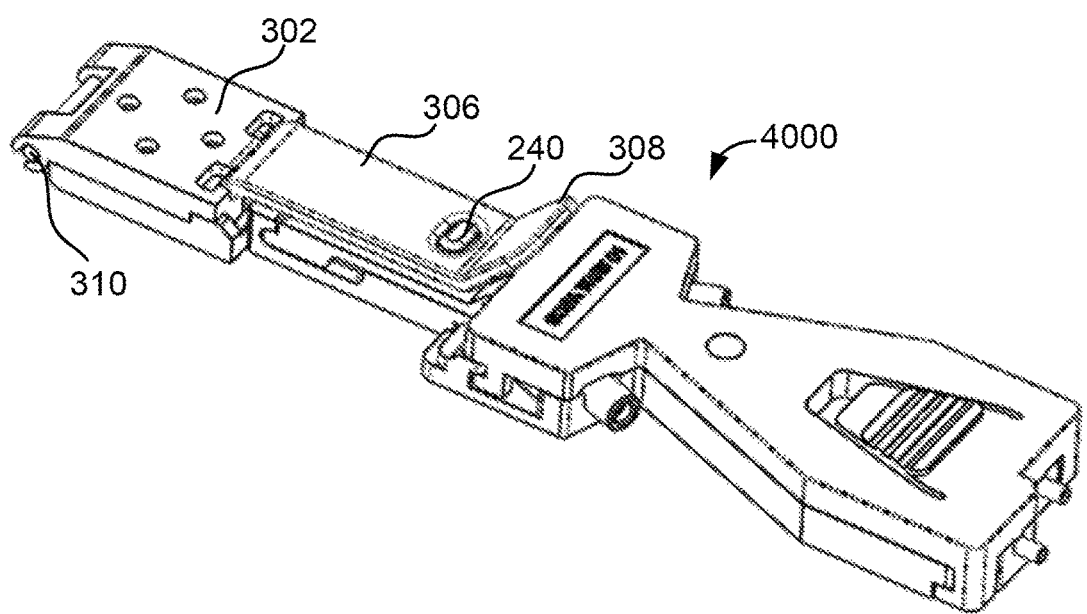
FIG. 10C is a perspective view of the protective cover in a closed position installed in the fiber tray according to the embodiment of the present invention.

FIG. 10C is a perspective view of the protective cover in a closed position installed in the fiber tray according to the embodiment of the present invention. As the protective cover 300 is closed by flipping the second member 302 towards the first member 301, the pair of male clip structures 305 is engaged with the pair of female clip structures 304 to partially lock the second member 302 with the first member 301, forming a small cavity in between to fully enclose the SiPho chip 40 as well as a section of attached fiber-array therein. Referring to the closed position of the protective cover 300 shown in FIG. 10C, the extended handle 306 substantially touches part of the top surface of the top-plate 200 such that the protruded bump 240 just passes through the through-hole 307 to further securely holding the protective cover 300 and the fiber tray sub-package 3000 together, forming a full fiber tray package 4000. In the full fiber tray package 4000, the protective cover 300 holds the SiPho chip 40 while being coupled to the fiber tray sub-package 3000 that still holds the fiber-array connected to the SiPho chip 40 through a gap between the first member 301 and the second member 302. In an alternative embodiment, the full fiber tray package 4000 provides full protection to both the SiPho chip 40 and the attached fiber-array of four fiber/ferrule/receptacle assemblies. These protections are important for handling the fiber-array attached with SiPho die in large-scale manufacturing as well as shipping. In another embodiment, the lifting portion 308 associated with the second member 302 is against a tilted part of the top surface of the top-plate 200 in the full fiber tray package 4000. Optionally, the lifting portion 308 is used to lift the extended handle 306 and the second member 302 as well and turn the protective cover 300 back to an opened position for further release the protective cover 300 from the fiber tray sub-package 3000. Further the sub-package 3000 of the fiber tray holding the fiber-array attached with the SiPho die can be positioned onto a test station for conducting various optical and electrical tests. This avoids unnecessary transfer handling of the SiPho IC and fibers.

Figure 11:
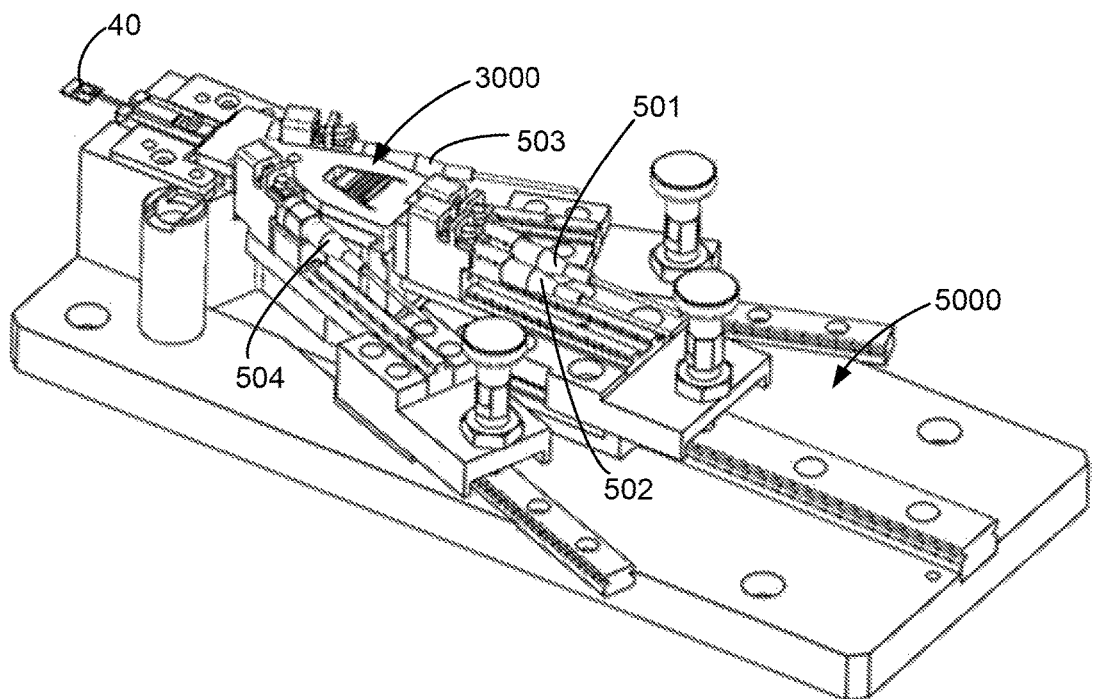
FIG. 11 is a perspective view of the fiber tray holding the fiber-array attached with the SiPho die and being mounted on a test station according to an embodiment of the present invention.

In another specific embodiment, the fiber tray in various sub-packages as disclosed in the specification above also provides a convenient apparatus for handling the fiber-array attached with a silicon-photonics chip to perform various optical and electrical testing without causing any damages to both the fiber-array and the SiPho chip and their attachment as well. FIG. 11 is a perspective view of the fiber tray sub-package being mounted on a test station according to an embodiment of the present invention. This diagram is merely an example, which should not unduly limit the scope of the claims. One of ordinary skill in the art would recognize many variations, alternatives, and modifications. As shown, the fiber tray sub-package 3000, which holds a fiber-array attached with a SiPho die 40, is mounted at least partially on a test station 5000. In particular, the bottom-plate 100 is configured to have built-in mounting structure (not explicitly shown) formed at its bottom-surface 112 that is just matching a corresponding mounting structure on the test station 5000. Optionally, the test station 5000 includes a fixture to hold two LC receptacles 501 and 502 with fiber pigtails to respectively connect the two LC ferrules from the first end of the fiber tray. Also, a pair of fixtures respectively holds two LC ferrules with fiber pigtails to respectively connect the two LC receptacles from two sides of the fiber tray. Using these fiber connections, the optical paths through all fibers of the fiber-array and the built-in waveguides inside the SiPho die 40 can be tested. The fiber tray sub-package 3000 just provides an easy handling tool to handle the fiber-array connected to the SiPho die during the test process. Optionally, although not shown in FIG. 11, the SiPho die 40 can also be in position to be plugged in with an electrical tester associated with the same test station 5000. While the fiber tray sub-package is firmed mounted on the test station 5000, various electrical tests on the SiPho die 40 can also be performed.

Figure 12:
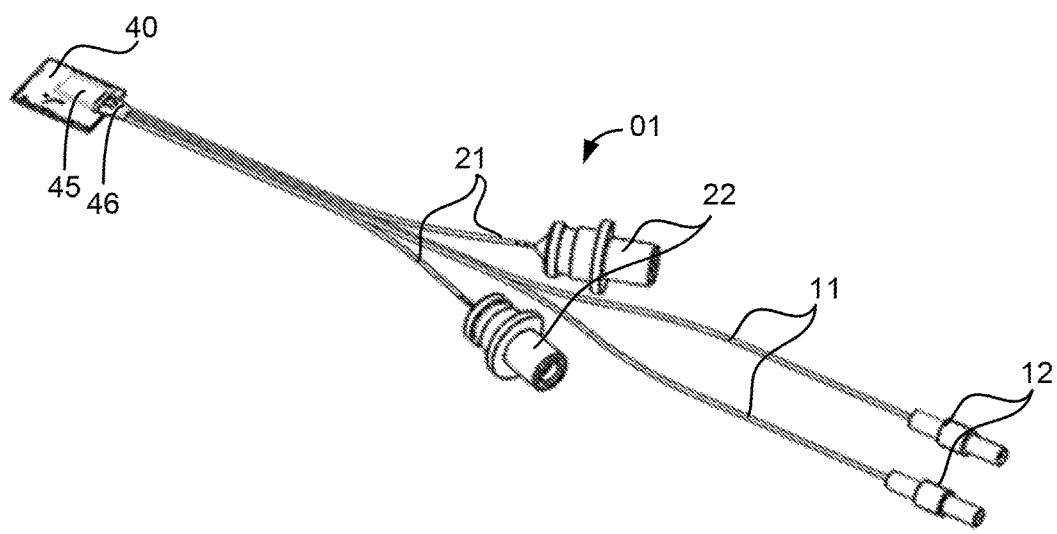
FIG. 12 is a perspective view of a fiber-array attached with a SiPho die according to an embodiment of the present invention.

FIG. 12 is a perspective view of a fiber-array attached with a SiPho die according to an embodiment of the present invention. As shown, a fiber-array of two fiber-assemblies 10 and two fiber-assemblies 20 is attached with a SiPho die 40 to form a fiber-array/SiPho-die assembly 01. The fiber-array/SiPho-die assembly 01 is substantially one held by a fiber tray in a sub-package 3000 which is also the one being placed on a test station 5000 to conduct various optical tests. After testing, the fiber-array/SiPho-die assembly 01 is removed from the fiber tray and is ready to be disposed in a package of a photonic transceiver that conforms to the QSFP specification having two laser diodes respectively connected to the two LC ferrules. In a specific embodiment, the fiber-array/SiPho-die assembly 01 is a SOSA assembly including two fiber assemblies 10 each having a PM fiber 11 of respective preferred length with one end terminated with a LC ferrule 12 and another end attached to the SiPho die 40, and another two fiber assemblies 20 each having a single-mode fiber 21 of respective preferred length with one end terminated by a LC connector receptacles 22 and another end attached to the same SiPho die 40. The attachment of the fiber-array with the SiPho die 40 includes a cover lid 45 placed over the fiber section inserted to V-grooves of the SiPho die and strain relief epoxy 46 placed around the fiber-array beyond the cover lid 45 and the edge of the SiPho die 40. As disclosed in earlier sections of the specification, the fiber-array of the fiber-array/SiPho-die assembly 01 can be conveniently held by the fiber tray in sub-package 3000 (see FIG. 8) and the SiPho die 40 in the same fiber-array/SiPho-die assembly 01 can also be protected by an additional protective cover 300 coupled with the fiber tray as shown in sub-package 4000 (see FIG. 10C). Of course, the fiber types in the fiber-array/SiPho-die assembly 01 can be all PM fibers or all single-mode fibers or any combination of both types. The LC ferrule or receptacle can also be replaced by different types of ferrule or receptacle for different applications.

Figure 13:
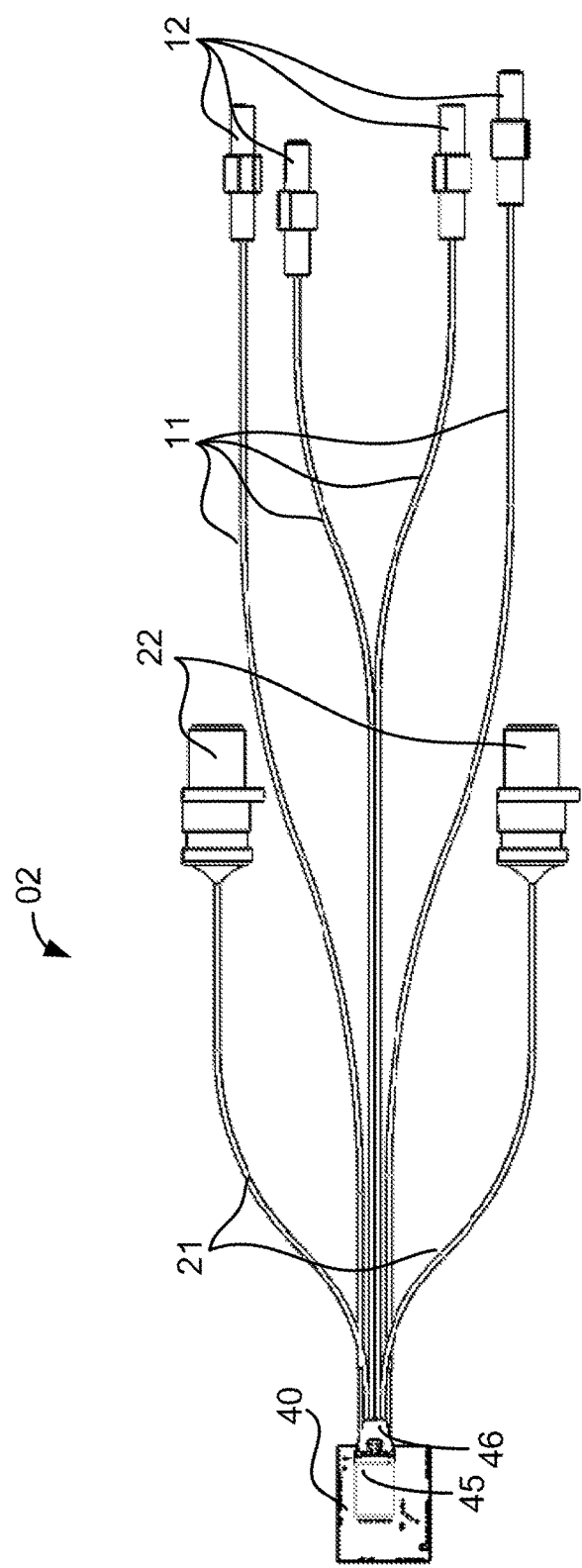
FIG. 13 is a perspective view of an alternative fiber-array attached with an alternative SiPho die according to another embodiment of the present invention.

FIG. 13 is a perspective view of an alternative fiber-array attached with an alternative SiPho die according to another embodiment of the present invention. In an alternative embodiment, the fiber-array/SiPho-die assembly 02 is a SOSA-like assembly including four fiber assemblies 10 each having a PM fiber 11 of respective preferred length with one end terminated with a LC ferrule 12 and another end attached to the SiPho die 40, and another two fiber assemblies 20 each having a single-mode fiber 21 of respective preferred length with one end terminated by a LC connector receptacles 22 and another end attached to the same SiPho die 40. According to an embodiment of the present invention, the 6-fiber fiber-array of the fiber-array/SiPho-die assembly 02 can be held inside a fiber tray like a sub-package 3000 (except that this is a 6-fiber fiber-array). The SiPho die 40 in the same fiber-array/SiPho-die assembly 02 can also be protected by an additional protective cover 300 coupled with the fiber tray as shown in sub-package 4000. The fiber-array/SiPho-die assembly 02 is configured to be disposed in a photonic transceiver having four laser diodes respectively connected to the four LC ferrules.

Figure 14:
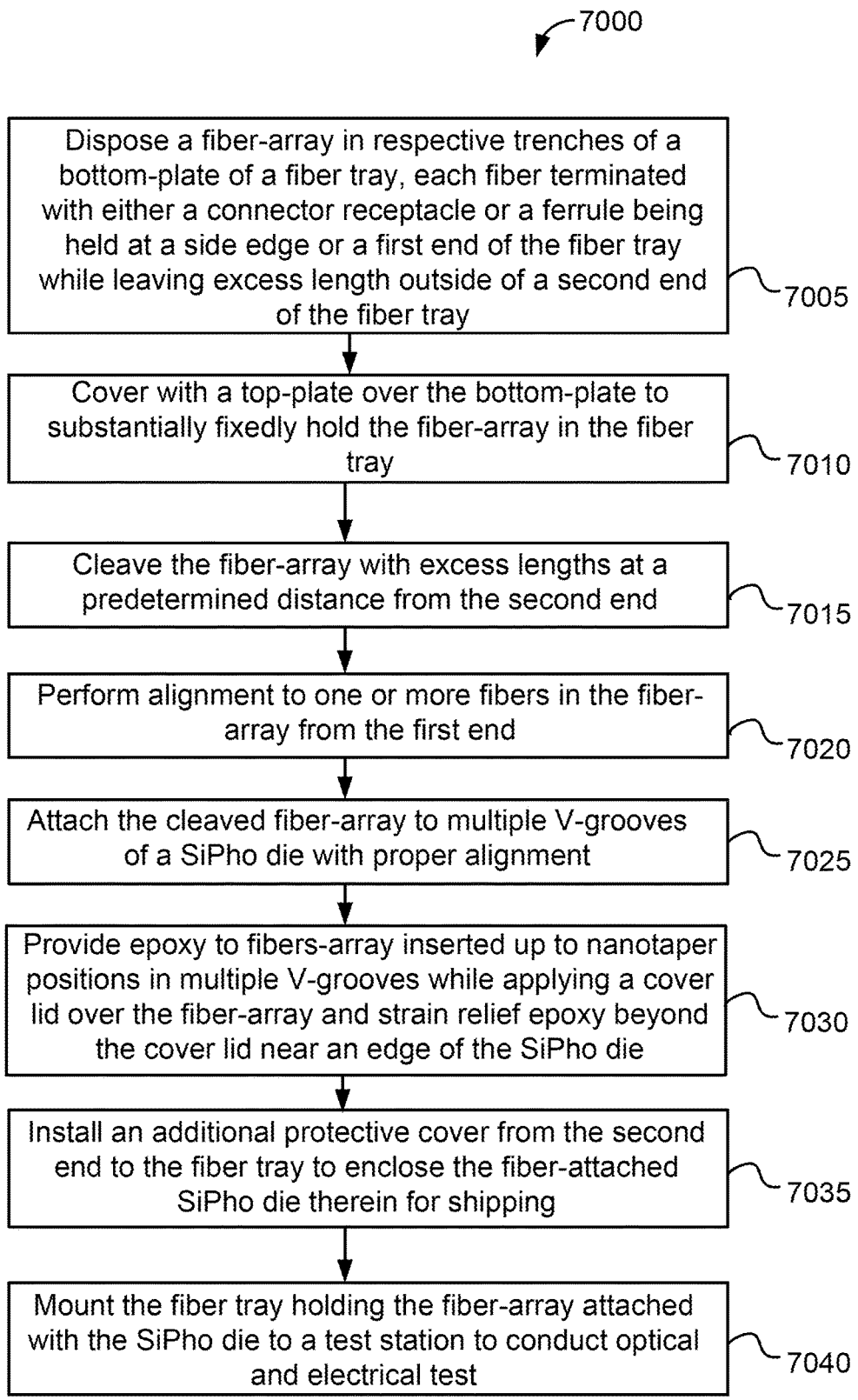
FIG. 14 is a flow chart showing a method for handling a fiber-array for attaching with a SiPho die according to an embodiment of the present invention.

FIG. 14 is a flow chart showing a method for handling the fiber-array for attaching with a SiPho die according to an embodiment of the present invention. This diagram is merely an example, which should not unduly limit the scope of the claims. One of ordinary skill in the art would recognize many variations, alternatives, and modifications. Provided with the fiber tray described throughout the specification and specifically depicted in FIG. 2 through FIG. 8, the present invention also provides a method of using this fiber tray to handle a 4-fiber fiber-array including loading individual fiber assembly into the bottom-plate of the fiber tray, closing the top-plate of the fiber tray to hold firmly the 4-fiber fiber-array, performing laser cleaving to have precision cut on the free fiber tail ends, aligning the fibers, attaching fiber-array with a silicon-photonics chip, and mounting it on a test station for performing optical and electrical test on the fiber-attached silicon-photonics chip.

Referring to FIG. 13, the method 7000 includes a process 7005 of disposing a fiber-array in respective two Y-shaped trenches of a bottom-plate of the fiber tray (provided as one shown in FIG. 2). Each fiber is a fiber assembly having one end terminated with either a connector receptacle or a ferrule and another end being left free with excess length. The connector receptacle or ferrule is substantially firmly held in a recessed region either at a side edge or a first end of the bottom-plate. The free ends of fibers are extended through a common branch of two Y-shaped trenches outside a second end of the bottom-plate with excess lengths without stringent limitation. In an example, each of two fiber assemblies disposed in a first Y-shaped trench located in the middle region of the bottom-plate includes a PM fiber terminated by a LC ferrule held in a recessed region next to the first end of the bottom-plate (see FIG. 3). Each of two fiber assemblies disposed in a second Y-shaped trench located in outer region includes a single-mode fiber terminated with a LC connector receptacle firmed held in a recessed region next to a side edge of the bottom-plate (see FIG. 3).

Referring to FIG. 13, further, the method 7000 includes a process 7010 of covering with a top-plate over the bottom-plate to substantially fixedly hold the fiber-array in the fiber tray (see FIG. 6). The top-plate is designed to be mated with the bottom-plate (see FIG. 4 and FIG. 5) so that the fiber assemblies are individually secured between the top-plate and the bottom-plate substantially without lateral and axial motion except rotation therein. The heads of the LC connector receptacles are exposed at the side edges of the fiber tray for connecting with external LC connectors with fiber pigtails and the tip regions of the LC ferrules are exposed outside the first end so as to be handled for optical testing and fiber alignment purposes. The free ends of four fibers are extended with excess lengths outside the second end of the fiber tray.

Referring to FIG. 13 again, the method 7000 additionally includes a process 7015 of performing laser cleave on the fiber-array with excess lengths. The laser cleave process is designed to cut the four fibers of the fiber-array with high precision along a perpendicular line at a predetermined distance from the second end. In an embodiment, laser cleave can achieve precision of cutting within 10 µm among the four fibers. The predetermined distance is designed to provide a desired length of a final assembly of fiber-array attached with a silicon-photonics chip (see FIG. 12) which is required for properly installing into an optical transceiver in single compact configuration.

Referring to FIG. 13, the method 7000 further includes a process 7020 of performing alignment to one or more fibers in the fiber-array from the first end. In a particular example, the two fibers having their one end terminated by LC ferrules are PM fibers. By rotating LC ferrule from the exposed tip region at the first end, the fiber core position can be adjusted. In an example, the PM fiber alignment is done by tuning the two stress-rods of each PM fiber to a direction in parallel to a plane formed by the fiber-array (see FIG. 9C). This fiber-array with PM fiber alignment is ready for being attached with a silicon-photonics chip.

The method 7000 also includes a process 7025 of attaching the cleaved fiber-array to multiple V-grooves of a SiPho die with proper fiber alignment. In particular, a certain length of the end section of the cleaved fiber-array are processed to remove their cladding material (see FIG. 9C), which is no smaller than a length of each V-grove prefabricated in a top surface of a silicon-photonics chip (see FIG. 9A). The process 7025 including loading the length of fiber with stripped cladding material into array of V groves so that the cleaved fiber ends being substantially in contact with nanotaper positions of V-groves to couple with respective silicon waveguides. As the cleaved fiber ends have been cut with high precision so that the optical coupling with the silicon waveguide would be substantially well without issues in optical loss or chipping of the SiPho die. Also, the PM fibers are aligned to have their stress-rods in parallel to the top surface of the silicon-photonics chip (see FIG. 9D).

Referring to FIG. 13, the method 7000 includes a process 7030 of providing epoxy to fibers that just are fully inserted in the V-groves up to the nanotaper positions and a cover lid can be placed over it for protecting the fiber-array attachment with the SiPho die. The process 7030 also includes curing the epoxy to hold the cover lid in its place overlying the fiber-array end section inside the V-groves. Further, the process 7030 includes placing strain relief epoxy around a section of the fiber-array that is just a short length beyond the cover lid near an edge of the SiPho die. Since the fiber-array is attached to the V-groves formed in the top surface of the SiPho die and is only covered by the cover lid and the SiPho die still has a certain weight although the weight is small, a strain is induced particularly around the edge region of SiPho die where the fiber-array is coming out of the V-groves. This strain relief epoxy, of course, is designed to relieve the strain between the fiber-array and the attached SiPho die.

Referring to FIG. 13, the method 7000 includes a process 7035 of installing an additional protective cover from the second end to the fiber tray to enclose the fiber-attached SiPho die therein for shipping. After successful attachment of the fiber-array to the silicon-photonics chip under the proper holding of the fiber tray, a sub-package 3000 is formed, yet the silicon-photonics chip 40 remains exposed (see FIG. 8). By inserting a tail portion of a protective cover 300 (see FIG. 10A) into a slot from the second end of the fiber tray, the silicon-photonics chip can be partially supported by a first member of the protective cover (as it is in an opened position, see FIG. 10B). Then, by flipping a second member of the protective cover towards the first member via a hinge located at a first (joint) edge, a couple male clip structures in a third edge of the second member can be mated with a couple corresponding female clip structures in a second edge of the first member to fully enclose the silicon-photonics chip inside a small room between the first member and the second member (as it is in a closed position, see FIG. 10C). Additionally, by locking an extended handle of the protective cover coupled to the third edge to a bump on a top surface of the fiber tray, the protective cover 300 in its closed position (see FIG. 10C) is also securely coupled with the fiber tray, forming a full package 4000 for holding both the fiber-array and the attached silicon-photonics chip. This package can be conveniently used for shipping the enclosed assembly of fiber-array and silicon-photonics (SiPho) chip with full protection to the delicate members of the assembly like the fibers, ferrules, and SiPho chip. Many shipping-related fiber tangling, breaking, or other damages can be avoided.

Further referring to FIG. 13, the method includes a process of 7040 of mounting the fiber tray holding the fiber-array attached with the SiPho die to a test station to conduct optical and electrical test. In particular, a sub-package 3000 of the fiber tray holding the fiber-array attached with the SiPho die is involved in this process. The bottom-plate of the fiber tray is configured to have its built-in mounting structure mated with a corresponding receiving structure formed on a test station (see FIG. 11). Thus, instead of directly touching the delicate fibers in the assembly of the fiber-array attached with the SiPho die by human hands, the fiber tray of the present invention provides full protection and support for the fiber-array on the test station. Many handling damages to the individual fibers especially near the ferrule and receptacle due to operator error or uncontrolled shift of ferrule or receptacle during the test can be avoided by using the fiber tray of the present invention. As seen in FIG. 11, the test station is also configured to have corresponding fixtures to hold external LC connectors to respectively connect to the LC ferrules or LC receptacles held by the fiber tray. Through these optical connection, optical test on the fiber-array and the attached SiPho die can be performed. Also, the SiPho die itself also can be coupled with an electrical tester to form full electrical contact to the pins formed on the top or bottom surfaces of the SiPho die which remains being attached with the fiber-array.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of using a fiber tray to handle a fiber-array in association with a silicon-photonics chip, the fiber tray comprising:
a bottom-plate comprising a first Y-shaped trench and a second Y-shaped trench formed in a top surface thereof, the first Y-shaped trench having two first branches respectively connected to two first recessed regions straightly towards a first end of the bottom-plate and one second branch laid backwards to a second end of the bottom-plate, the second Y-shaped trench sharing the same second branch and having two third branches laid outside the two first branches respectively connected to two second recessed regions with an angle towards two sides of the bottom-plate, the bottom-plate comprising a plurality of female clip structures formed at both the first end and the second end;
a top-plate comprising two third recessed regions formed in a bottom surface at a third end thereof, two fourth recessed regions formed in the bottom surface with the angle respectively towards two sides of the top-plate, and a plurality of male clip structures formed at both the third end and the fourth end;
wherein the plurality of male clip structures is configured to lock respectively with the plurality of female clip structures as the bottom surface of the top-plate is engaged with the top surface of the bottom-plate with the third end being aligned with the first end and the fourth end being aligned with the second end such that the two third recessed regions are opposed to the two first recessed regions to form two first cavities connected to the two first branches of the first Y-shaped trench enclosed therein and the two fourth recessed regions are opposed to the two second recessed region to form two second cavities connected to the two third branches of the second Y-shaped trench enclosed therein;
the method comprising:
disposing a fiber-array of two PM fibers of excess lengths having one end terminated by two LC ferrules and two single-mode fibers of excess lengths having one end terminated by two LC receptacles to the bottom plate, the two PM fibers being loaded in the first Y-shaped trench with the two LC ferrules being held inside the two first recessed regions at the first end and two bare fibers of extra lengths extended outside the second end, the two single-mode fibers being loaded in the second Y-shaped trench with the two LC receptacles being held inside the two second recessed regions at two sides and two bare fibers of extra lengths extended outside the second end via the second branch commonly shared by the two PM fibers;
covering the top-plate over the bottom-plate by mating the plurality of male clip structures of the top-plate with the corresponding plurality of female clip structures to substantially fixedly hold the fiber-array in the fiber tray with at least the two LC ferrules being partially enclosed in the two first cavities substantially without lateral and axial motion except rotation with two tip regions of the two LC ferrules being exposed outside the first end and the two LC receptacles being partially enclosed in the two second cavities substantially without lateral and axial motion;
cleaving the fiber-array by laser at a predetermined distance away from the second end along a perpendicular line within +/−10 microns;
aligning the two PM fibers in the fiber-array;
attaching a length from the cleaved end of the fiber-array with the aligned PM fibers to a silicon-photonics chip;
providing epoxy to the length of the fiber-array while placing a cover lid over thereof and adding strain relief epoxy around a near-by section of the fiber-array beyond the cover lid;
installing a protective cover from the second end to the fiber tray to enclose the silicon-photonics chip attached with the fiber-array;
mounting the bottom-plate of the fiber tray onto a test station for conducting optical and electrical tests on the silicon-photonics chip attached with the fiber-array, the fiber-array being fixedly held in the fiber tray with correspondingly two LC receptacles respectively connected to two external fibers via two LC ferrules and two LC ferrules respectively coupled to other two external fibers via two LC receptacles.

2. The method of claim 1 wherein the bottom-plate further comprises a pair of female clip structures formed at edge regions of two sides beyond the two second recessed regions.

3. The method of claim 1 wherein aligning the two PM fibers comprising rotating two LC ferrules from the tip regions exposed outside the first end to adjust orientation of two stress rods of each PM fiber.

4. The method of claim 3 wherein attaching a length from the cleaved end of the fiber-array comprises loading the length of each fiber into one of multiple V-grooves etched in a top surface of the silicon-photonics chip, wherein the cleaved end of each fiber is in contact with a nanotaper position of a corresponding V-grove connecting a waveguide and the two stress rods of each PM fiber is aligned to be in parallel with the top surface.

5. The method of claim 1 wherein the bottom-plate further comprises an open slot disposed from the second end in a bottom surface below the second branch shared by the first Y-shaped trench and the second Y-shaped trench thereof.

6. The method of claim 5 wherein the protective cover comprises a first member and a second member joined by a hinge, the first member having a tail portion configured to be slide into the open slot from the second end to couple with the bottom-plate and allow the silicon-photonics chip attached with the fiber-array to be rested in a recessed region thereof, the second member being configured to flip back to lock with the first member to enclose the silicon-photonics chip in the recessed region.

* * * * *